(12) United States Patent
Shen

(10) Patent No.: US 12,730,585 B2
(45) Date of Patent: Sep. 8, 2026

(54) SAME BANK REFRESH COMMAND SCHEDULING

(71) Applicant: Advanced Micro Devices, Inc., Santa Clara, CA (US)

(72) Inventor: Guanhao Shen, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 64 days.

(21) Appl. No.: 18/899,639

(22) Filed: Sep. 27, 2024

(65) Prior Publication Data

US 2026/0093415 A1 Apr. 2, 2026

(51) Int. Cl.
*G06F 3/06* (2006.01)

(52) U.S. Cl.
CPC .......... *G06F 3/0659* (2013.01); *G06F 3/0604* (2013.01); *G06F 3/0673* (2013.01)

(58) Field of Classification Search
CPC ..... G06F 3/0659; G06F 3/0604; G06F 3/0673
See application file for complete search history.

(56) References Cited

U.S. PATENT DOCUMENTS 9,576,637 B1 2/2017 Balakrishnan
10,109,340 B2 10/2018 Bains et al.
10,318,187 B2 6/2019 Park et al.
10,593,392 B1 3/2020 Johnson et al.
11,100,974 B2 8/2021 Lee
2006/0004955 A1* 1/2006 Ware .................... G11C 11/406 365/222
2017/0364469 A1 12/2017 Crisp
2020/0020384 A1 1/2020 Zhao et al.
2020/0027499 A1* 1/2020 Balakrishnan .... G11C 11/40622
2024/0211173 A1 6/2024 Balakrishnan et al.
2025/0104758 A1 3/2025 Sethi et al.

OTHER PUBLICATIONS

JEDEC Standard; DDR5 SDRAM; JESD79-5; JEDEC Solid State Technology Association, 3103 North 10th Street, Suite 240 South, Arlington, VA 22201-2107; Jul. 2020; 496 pages.
Action on the Merits by U.S.P.T.O regarding U.S. Appl. No. 19/000,151, filed Dec. 23, 2024.

* cited by examiner

*Primary Examiner* — Janice M. Girouard
(74) *Attorney, Agent, or Firm* — Polansky & Associates, P.L.L.C.; Paul J. Polansky

(57) ABSTRACT

A data processor includes a memory accessing agent and a memory controller. The memory accessing agent is for generating memory access requests for a memory. The memory controller includes a command queue and a refresh controller. The command queue is for storing the memory access requests. The refresh controller is coupled to the command queue and is operable to select an order of providing same bank refresh commands to a plurality of refresh groups of corresponding banks in the memory based on an aggregate request count of the memory access requests in the command queue.

16 Claims, 4 Drawing Sheets

SAME BANK REFRESH COMMAND SCHEDULING

CROSS-REFERENCE TO RELATED APPLICATION

Related subjected matter is found in U.S. patent application Ser. No. 19/000,151, filed Dec. 23, 2024, invented by Kedarnath Balakrishnan, and assigned to the assignee hereof.

BACKGROUND

Dynamic random-access memory (DRAM) chips include large arrays of memory cells that represent data as charges stored in capacitors. The charges in the capacitors tend to leak over time, requiring the memory cells to be periodically "refreshed". A refresh operation includes reading the state of the memory cell before it has leaked too much, and then rewriting it to restore the full amount of charge on the capacitor, thereby "refreshing" the memory cell. The refresh operation needs to be performed within a certain time interval based on the physics of the memory cell. While performing a refresh operation, the memory or a portion of the memory is unavailable for normal read or write operation, potentially causing disruptions to the operation of the computer system.

Figure 1:
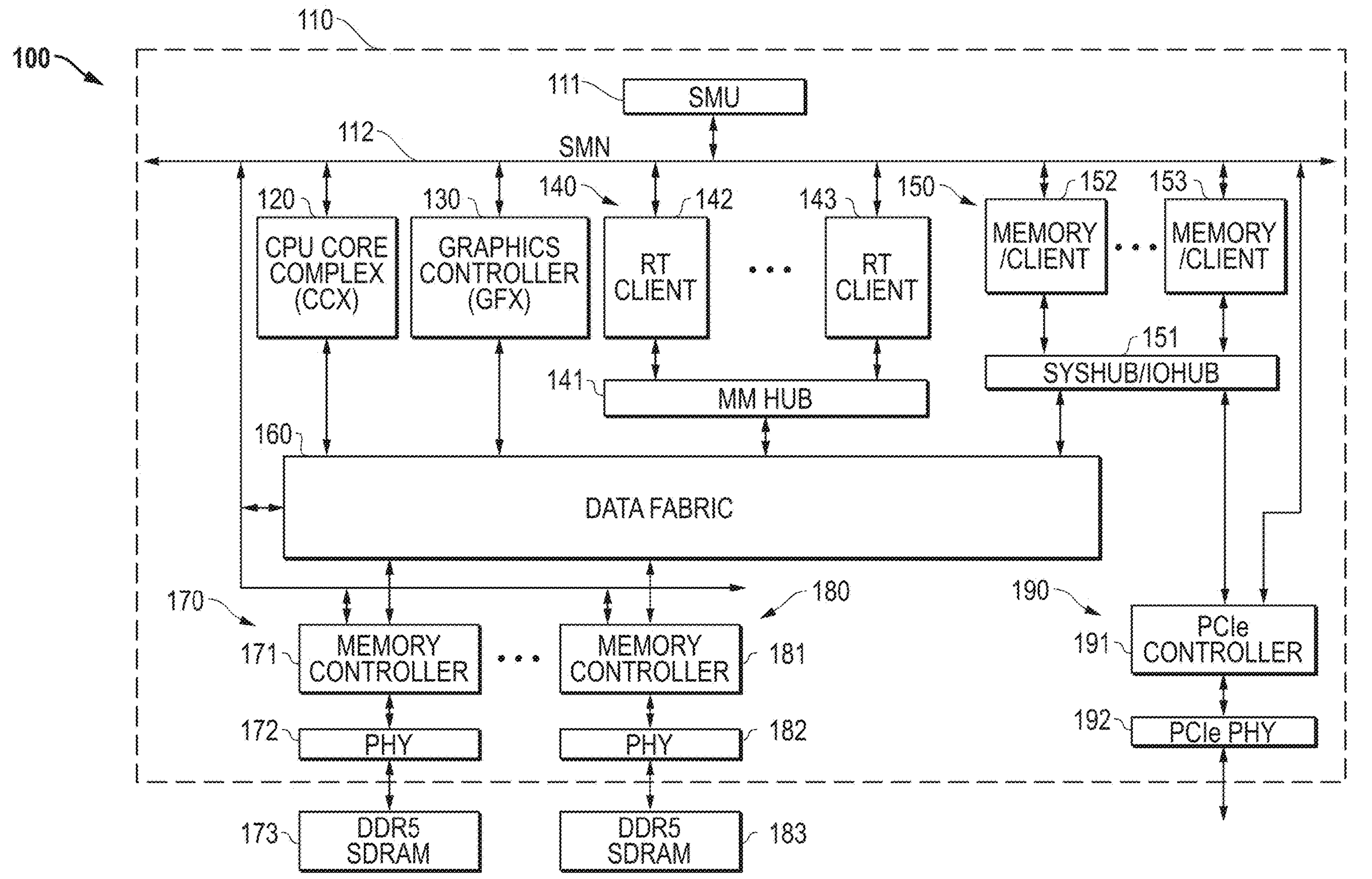
FIG. 1 illustrates in block diagram form a data processing system according to some implementations.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate implementations using suitable forms of indirect electrical connection as well. The following Detailed Description is directed to electronic circuitry, and the description of a block shown in a drawing figure implies the implementation of the described function using suitable electronic circuitry, unless otherwise noted.

DETAILED DESCRIPTION OF ILLUSTRATIVE IMPLEMENTATIONS

DRAM chips are typically refreshed one row at a time. A row is a set of memory cells that are accessed together for read or write cycles. During a refresh operation, the states of the memory cells along the row are sensed at the same time using sense amplifiers that detect small amounts of charge remaining on the memory cells, and determine whether they represent a logic "1" state or a logic "0" state. After sensing the logic states in the row buffer, they are re-written to the capacitors forming the memory cells to restore the memory cells to their full charge levels.

Most DRAM chips sold today are compatible with various double data rate (DDR) DRAM standards promulgated by the Joint Electron Devices Engineering Council (JEDEC). The standards published by JEDEC specify this time interval as the refresh interval, or "tREFI". Since all memory cells in the memory chip must be refreshed, on average, within the refresh interval, larger DDR DRAM chips require more total time during which they cannot perform normal read and write accesses. This total time is known as "latency" because the normal read and write accesses remain pending (or "latent") while the memory is being refreshed. For example, currently available memory chips having storage capacities on the order of several Gigabits (Gb). In these memory chips, the latency required to refresh the entire memory can be relatively large, such as 300-500 nanoseconds (ns), or about 1000-1600 clock cycles at current memory clock speeds.

An entire memory array can be refreshed one row at a time, but DDR memories have alternative refresh operations so the whole memory is not rendered unavailable while all the rows in the memory are refreshed. DDR memories are organized into banks, which are subsets of the whole memory that can be accessed independently from each other. Each bank has its own sense amplifiers and row buffers, and so a whole bank can be refreshed while the other banks remain available for read and write accesses. The worst-case latency of an access to a memory bank being refreshed is approximately equal to the amount of time needed to refresh the whole memory bank, but because other banks are still available for read and write accesses, the average latency because of refresh operations is lower. Using this refresh scheme, known as a per-bank refresh, the memory controller issues one per-bank refresh command to each of the memory banks during each refresh interval.

JEDEC adopted a new refresh feature for low-power double data rate (LPDDR), version four (LPDDR4) memories known as per-bank refresh ($REF_{pb}$). When per-bank refresh is selected, the memory will refresh only a single bank at a time and maintain an internal counter to keep track of the next memory bank to be refreshed. If the memory has 32 banks, then the memory controller issues per-bank refresh commands at an average rate of tREFI/32. These per-bank refreshes can be spread evenly across the refresh interval. Thus, per-bank refresh mode improves command latency, but still requires the overhead of issuing the individual per-bank refreshes, because of the need to successively place each bank into the idle state before issuing a per-bank refresh command to it.

The most recent DDR standard is version 5 (DDR5). DDR5 introduced a new refresh command, known as "same bank" refresh ($REF_{sb}$) that lowers the refresh overhead. DDR versions starting with DDR4 combined memory banks into "bank groups" that share some common circuitry while imposing some restrictions on operations that can occur in multiple banks in the same bank group at around the same time. The same bank refresh command allows one corresponding memory bank in each bank group to be refreshed concurrently while the other memory banks are available for read and write operations. Thus, the same bank refresh command offers the possibility of maintaining relatively low latency but also reducing the overhead of the refresh operations to improve overall bus efficiency. Further performance improvements using the same bank refresh command would be desirable.

A memory controller according to various implementations disclosed herein leverages the capabilities of the new DDR5 same bank refresh command to obtain both higher bus utilization and efficiency as well as lower latency by taking into account the workload of the memory controller. It schedules same bank refresh commands to refresh groups in an order that achieves better efficiency given the current workload of the memory controller. The memory controller counts the number of memory access requests to the refresh groups in the command queue, and schedules same bank refresh commands in an order that avoids more-active refresh groups while picking less-active refresh groups to send same bank refresh commands to. In particular, it examines the commands present in a command queue of the memory controller, and determines an “aggregate request count” as the sum of all the commands for all the banks in a particular refresh group. It schedules same bank refresh commands in an order within a refresh round to achieve better bus utilization, leveraging the property that same bank refreshes can be scheduled in any order within a round corresponding to tREFI, in which a round includes a set of same bank refresh commands that refresh all banks in the memory.

A data processor includes a memory accessing agent and a memory controller. The memory accessing agent is for generating memory access requests for a memory. The memory controller includes a command queue and a refresh controller. The command queue is for storing the memory access requests. The refresh controller is coupled to the command queue and is operable to select an order of providing same bank refresh commands to a plurality of refresh groups of corresponding banks in the memory based on an aggregate request count of the memory access requests in the command queue.

A data processing system includes a data processor, and a memory coupled to the data processor. The memory is operable to execute a same bank refresh command by refreshing a group of corresponding banks in the plurality of bank groups in response to the same bank refresh command. The data processor includes a memory controller having a command queue for storing memory access requests. The memory controller is operable select an order of providing same bank refresh commands to a plurality of refresh groups of the corresponding banks in the memory based on an aggregate request count of the memory access requests in the command queue.

A method for refreshing a memory having a plurality of bank groups by a memory controller having a command queue for storing memory access requests. The method includes, during a predetermined time interval: picking a next refresh group with a lowest aggregate request count of the memory access requests in the command queue among one or more refresh groups that have not yet been picked in a current round, wherein each refresh group defines a corresponding bank in each of the plurality of bank groups, and generating a same bank refresh command for the next refresh group.

A data processor, data processing system, and method as described herein reduce the average latency of commands by preferentially scheduling same bank refresh commands to refresh groups that have the lowest aggregate request counts that have not yet been refreshed in the current round. In this way, refresh groups with larger aggregate request counts are able to stay active longer and process their pending memory access requests quicker. Thus, more commands can be completed while fewer commands need to be stalled in the refresh group undergoing refresh, reducing average latency.

FIG. 1 illustrates in block diagram form a data processing system 100 according to some implementations. Data processing system 100 includes a data processor 110 in the form of an APU and memory in the form of Double Data Rate, version 5, synchronous dynamic random-access memory (DDR5 SDRAMs) including an DDR5 memory 173 and an DDR5 memory 183. Many other components of an actual data processing system are typically present but are not relevant to understanding the present disclosure and are not shown in FIG. 1 for ease of illustration.

Data processor 110 includes generally a system management unit 111 labelled “SMU”, a system management network (SMN) 112, a central processing unit (CPU) core complex 120 labeled “CCX”, a graphics controller 130 labeled “GFX”, a real-time client subsystem 140, a memory/client subsystem 150, a data fabric 160, memory channels 170 and 180, and a Peripheral Component Interface Express (PCIe) subsystem 190. As will be appreciated by a person of ordinary skill, data processor 110 may not have all of these elements present in every implementation and, further, may have additional elements included therein.

SMU 111 is bidirectionally connected to the major components in data processor 110 over SMN 112. SMN 112 forms a control fabric for data processor 110. SMU 111 is a local controller that controls the operation of the resources on data processor 110 and synchronizes communication among them. SMU 111 manages power-up sequencing of the various processors on data processor 110 and controls multiple off-chip devices via reset, enable and other signals. SMU 111 includes one or more clock sources (not shown), such as a phase locked loop (PLL), to provide clock signals for each of the components of data processor 110. SMU 111 also manages power for the various processors and other functional blocks, and may receive measured power consumption values from CPU cores in CPU core complex 120 and graphics controller 130 to determine appropriate P-states.

CPU core complex 120 includes a set of CPU cores, each of which is bidirectionally connected to SMU 111 over SMN 112. Each CPU core may be a unitary core only sharing a last-level cache with the other CPU cores, or may be combined with some but not all of the other cores in clusters.

Graphics controller 130 is bidirectionally connected to SMU 111 over SMN 112. Graphics controller 130 is a high-performance graphics processing unit capable of performing graphics operations such as vertex processing, fragment processing, shading, texture blending, and the like in a highly integrated and parallel fashion. In order to perform its operations, graphics controller 130 requires periodic access to external memory. In the implementation shown in FIG. 1, graphics controller 130 shares a common memory subsystem with CPU cores in CPU core complex 120, an architecture known as a unified memory architecture. Because data processor 110 includes both a CPU and a GPU, it is also referred to as an accelerated processing unit (APU).

Real-time client subsystem 140 includes a set of real-time clients such as representative real time clients 142 and 143, and a memory management hub 141 labeled “MM HUB”. Each real-time client is bidirectionally connected to SMU 111 over SMN 112, and to memory management hub 141. Real-time clients in real-time client subsystem 140 could be any type of peripheral controller that requires periodic movement of data, such as an image signal processor (ISP), an audio coder-decoder (codec), a display controller that renders and rasterizes objects generated by graphics controller 130 for display on a monitor, and the like.

Memory/client subsystem 150 includes a set of memory elements or peripheral controllers such as representative memory/client devices 152 and 153, and a system and input/output hub 151 labeled "SYSHUB/IOHUB". Each memory/client device is bidirectionally connected to SMU 111 over SMN 112, and to system and input/output hub 151. Memory/client devices are circuits that either store data or require access to data on an aperiodic fashion, such as a non-volatile memory, a static random-access memory (SRAM), an external disk controller such as a Serial Advanced Technology Attachment (SATA) interface controller, a universal serial bus (USB) controller, a system management hub, and the like.

Data fabric 160 is an interconnect that controls the flow of traffic in data processor 110. Data fabric 160 is bidirectionally connected to SMU 111 over SMN 112, and is bidirectionally connected to CPU core complex 120, graphics controller 130, memory management hub 141, system and input/output hub 151. Data fabric 160 includes a crossbar switch for routing memory-mapped access requests and responses between any of the various devices of data processor 110. It includes a system memory map, defined by a basic input/output system (BIOS), for determining destinations of memory accesses based on the system configuration, as well as buffers for each virtual connection.

Memory channels 170 and 180 are circuits that control the transfer of data to and from DDR5 memory 173 and DDR5 memory 183. Memory channel 170 is formed by a memory controller 171 and a physical interface circuit 172 labeled "PHY" connected to DDR5 memory 173. Memory controller 171 is bidirectionally connected to SMU 111 over SMN 112 and has an upstream port bidirectionally connected to data fabric 160, and a downstream port. Physical interface circuit 172 has an upstream port bidirectionally connected to memory controller 171, and a downstream port bidirectionally connected to DDR5 memory 173. Similarly, memory channel 180 is formed by a memory controller 181 and a physical interface circuit 182 connected to DDR5 memory 183. Memory controller 181 is bidirectionally connected to SMU 111 over SMN 112 and has an upstream port bidirectionally connected to data fabric 160, and a downstream port. Physical interface circuit 182 has an upstream port bidirectionally connected to memory controller 181, and a downstream port bidirectionally connected to DDR5 memory 183.

Peripheral Component Interface Express (PCIe) subsystem 190 includes a PCIe controller 191 and a PCIe physical interface circuit 192. PCIe controller 191 is bidirectionally connected to SMU 111 over SMN 112 and has an upstream port bidirectionally connected to system and input/output hub 151, and a downstream port. PCIe physical interface circuit 192 has an upstream port bidirectionally connected to PCIe controller 191, and a downstream port bidirectionally connected to a PCIe fabric, not shown in FIG. 1. PCIe controller is capable of forming a PCIe root complex of a PCIe system for connection to a PCIe network including PCIe switches, routers, and devices.

In operation, data processor 110 integrates a complex assortment of computing and storage devices, including CPU core complex 120 and graphics controller 130, on a single chip. Most of the features of these controllers are well known and will not be discussed further. However, as will be described in greater detail below, a data processor includes a memory controller with a command queue for storing memory access requests and a refresh controller, connected to the command queue and operable to select an order of providing same bank refresh commands to a plurality of refresh groups of corresponding banks in the memory based on an aggregate request count of the memory access requests in the command queue. Specifically, during a round of same bank refreshes, the memory controller repeatedly picks refresh groups with the lowest aggregate request count among the refresh groups that have not yet been picked in the current round until all refresh groups have been picked. Thus, the memory controller ensures that all memory banks are refreshed with the refresh interval (tREFI), while intelligently selecting the order to improve bus utilization and reduce command latency.

Figure 2:
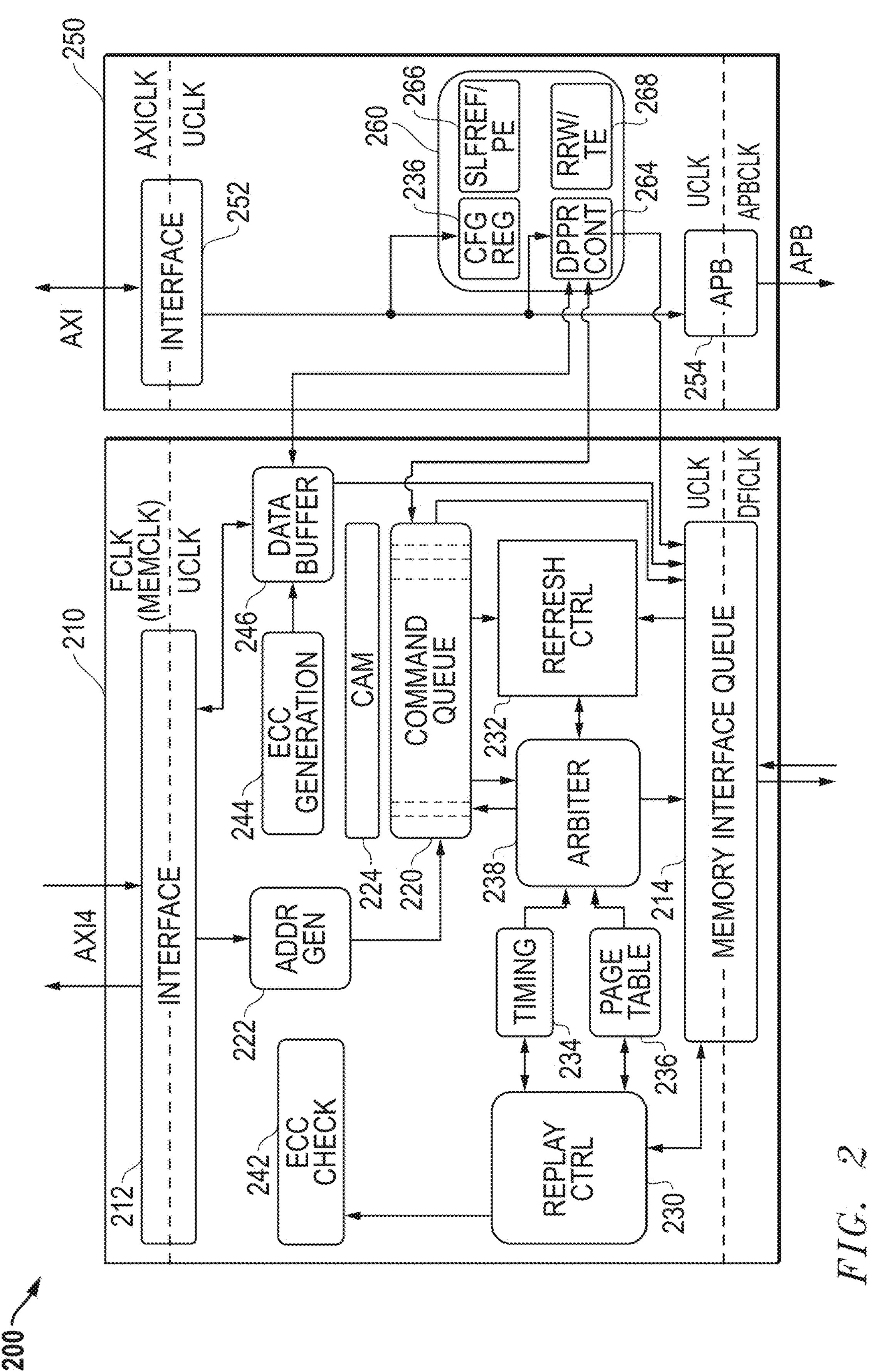
FIG. 2 illustrates in block diagram form a memory controller according to some implementations.

FIG. 2 illustrates in block diagram form a memory controller 200 known in the prior art. Memory controller 200 includes a memory channel controller 210 and a power controller 250. Memory channel controller 210 includes an interface 212, a memory interface queue 214, a command queue 220, an address generator 222, a content addressable memory 224 labelled "CAM", a replay queue 230, a refresh controller 232, a timing block 234, a page table 236, an arbiter 238, an error correction code (ECC) check block 242, an ECC generation block 244, and a data buffer 246 labelled "DB".

Interface 212 has a first bidirectional connection to data fabric 125 over an external bus, and has an output. In memory controller 200, this external bus is compatible with the advanced extensible interface version four specified by ARM Holdings, PLC of Cambridge, England, known as "AXI4", but can be other types of interfaces in other embodiments. Interface 212 translates memory access requests from a first clock domain known as the FCLK (or MEMCLK) domain to a second clock domain internal to memory controller 200 known as the UCLK domain. Similarly, memory interface queue 214 provides memory accesses from the UCLK domain to the DFICLK domain associated with the DFI interface.

Address generator 222 decodes addresses of memory access requests received from data fabric 125 over the AXI4 bus. The memory access requests include access addresses in the physical address space represented as normalized addresses. Address generator 222 converts the normalized addresses into a format that can be used to address the actual memory devices in the memory system, as well as to efficiently schedule related accesses. This format includes a region identifier that associates the memory access request with a particular rank, a row address, a column address, a bank address, and a bank group. On startup, the system BIOS queries the memory devices in the memory system to determine their size and configuration, and programs a set of configuration registers associated with address generator 222. Address generator 222 uses the configuration stored in the configuration registers to translate the normalized addresses into the appropriate format. Command queue 220 is a queue of memory access requests received from the memory accessing agents in data processor 110, such as CPU core complex 120, graphics controller 130, etc. Command queue 220 stores the address fields decoded by address generator 222 as well other address information that allows arbiter 238 to select memory accesses efficiently, including access type and quality of service (QoS) identifiers. Content addressable memory 224 includes information to enforce ordering rules, such as write after write (WAW) and read after write (RAW) ordering rules.

Replay queue 230 is a temporary queue for storing memory accesses picked by arbiter 238 that are awaiting responses, such as address and command parity responses, write cyclic redundancy check (CRC) responses for DDR4 DRAM or write and read CRC responses for GDDR5 DRAM. Replay queue 230 accesses ECC check block 242 to determine whether the returned ECC is correct or indicates an error. Replay queue 230 allows the accesses to be replayed in the case of a parity or CRC error of one of these cycles.

Refresh controller 232 is a hardware circuit that includes various circuitry including timers, counters, state machines, registers, digital logic, and the like to implement same bank refresh commands, as well as various powerdown, refresh, and termination resistance (ZQ) calibration cycles that are generated separately from normal read and write memory access requests received from memory accessing agents. For example, if a memory rank is in precharge powerdown, it must be periodically awakened to run refresh cycles. In general, refresh controller 232 generates refresh commands periodically to prevent data errors caused by leaking of charge off storage capacitors of memory cells in DRAM chips. In addition, refresh controller 232 periodically calibrates ZQ to prevent mismatch in on-die termination resistance due to thermal changes in the system. Refresh controller 232 decides when to put DRAM devices in different power down modes.

Refresh controller 232 also has an input connected to command queue 220 and is operable to select an order of providing same bank refresh commands to a set of refresh groups of corresponding banks in the memory based on an aggregate request count of the memory access requests in the command queue. These operations will be described in greater detail below.

Arbiter 238 is bidirectionally connected to command queue 220 and is the heart of memory channel controller 210. It improves efficiency by intelligent scheduling of accesses to improve the usage of the memory bus. Arbiter 238 uses timing block 234 to enforce proper timing relationships by determining whether certain accesses in command queue 220 are eligible for issuance based on DRAM timing parameters. For example, each DRAM has a minimum specified time between activate commands to the same bank, known as "$t_{RC}$". Timing block 234 maintains a set of counters that determine eligibility based on this and other timing parameters specified in the JEDEC specification, and is bidirectionally connected to replay queue 230. Page table 236 maintains state information about active pages in each bank and rank of the memory channel for arbiter 238, and is bidirectionally connected to replay queue 230.

In response to write memory access requests received from interface 212, ECC generation block 244 computes an ECC according to the write data. Data buffer 246 stores the write data and ECC for received memory access requests. It outputs the combined write data/ECC to memory interface queue 214 when arbiter 238 picks the corresponding write access for dispatch to the memory channel.

Power controller 250 includes an interface 252 to an advanced extensible interface, version one (AXI), an APB interface 254, and a power engine 260. Interface 252 has a first bidirectional connection to the SMN, which includes an input for receiving an event signal labeled "EVENT_n" shown separately in FIG. 2, and an output. APB interface 254 has an input connected to the output of interface 252, and an output for connection to a PHY over an APB. Power engine 260 has an input connected to the output of interface 252, and an output connected to an input of memory interface queue 214. Power engine 260 includes a set of configuration registers 262, a microcontroller (μC) 264, a self refresh controller 266 labelled "SLFREF/PE", and a reliable read/write training engine 268 labelled "RRW/TE". Configuration registers 262 are programmed over the AXI bus, and store configuration information to control the operation of various blocks in memory controller 200. Accordingly, configuration registers 262 have outputs connected to these blocks that are not shown in detail in FIG. 2. Self refresh controller 266 is an engine that allows the manual generation of refreshes in addition to the automatic generation of refreshes by refresh controller 232. Reliable read/write training engine 268 provides a continuous memory access stream to memory or I/O devices for such purposes as DDR interface read latency training and loopback testing.

Memory channel controller 210 includes circuitry that allows it to pick memory accesses for dispatch to the associated memory channel. In order to make the desired arbitration decisions, address generator 222 decodes the address information into predecoded information including rank, row address, column address, bank address, and bank group in the memory system, and command queue 220 stores the predecoded information. Configuration registers 262 store configuration information to determine how address generator 222 decodes the received address information. Arbiter 238 uses the decoded address information, timing eligibility information indicated by timing block 234, and active page information indicated by page table 236 to efficiently schedule memory accesses while observing other criteria such as QoS requirements. For example, arbiter 238 implements a preference for accesses to open pages to avoid the overhead of precharge and activation commands required to change memory pages, and hides overhead accesses to one bank by interleaving them with read and write accesses to another bank. In particular during normal operation, arbiter 238 may decide to keep pages open in different banks until they are required to be precharged prior to selecting a different page.

Figure 3:
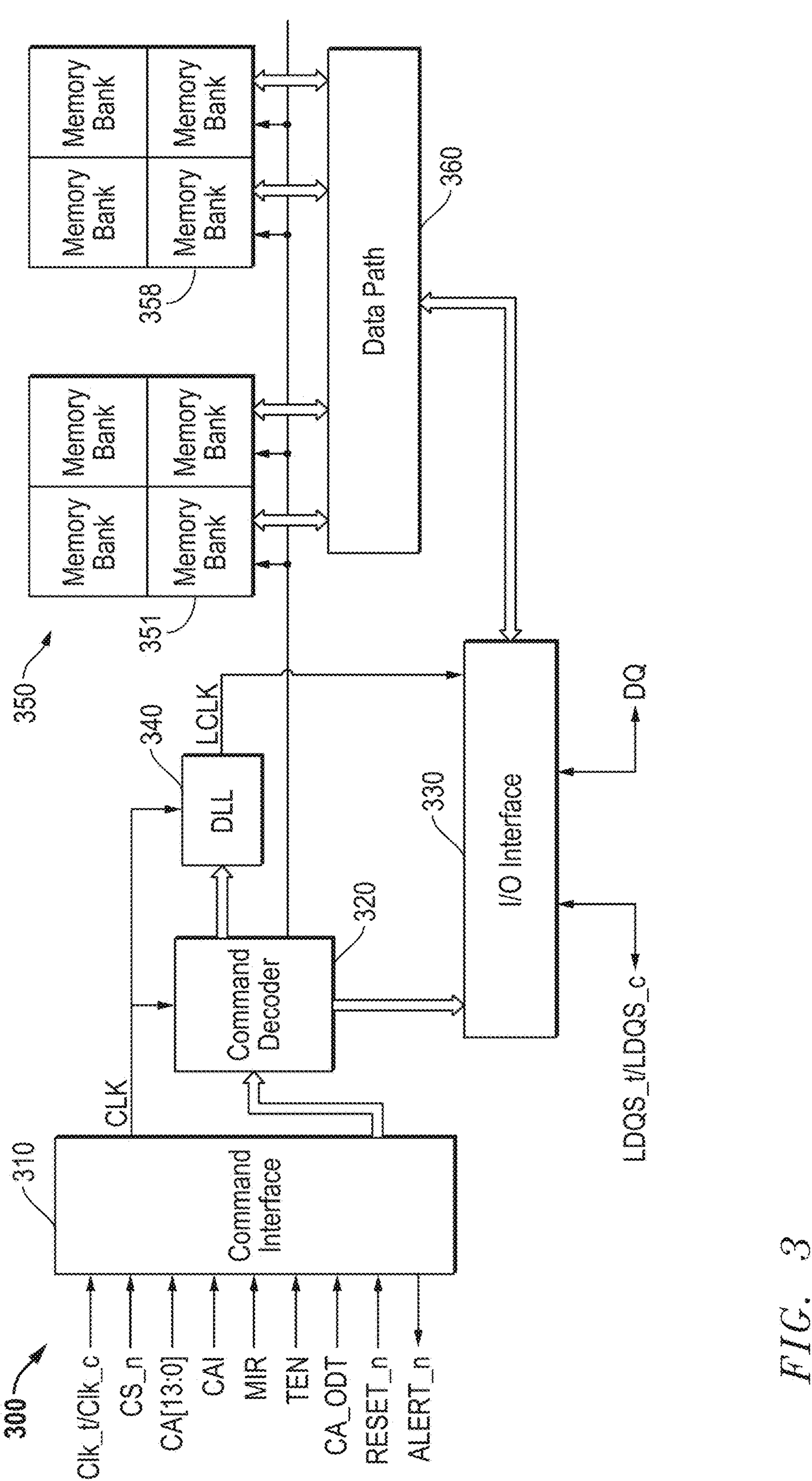
FIG. 3 illustrates in block diagram form a memory having bank groups suitable for use with the memory controller of FIG. 2 according to some implementations.

FIG. 3 illustrates in block diagram form a memory 300 having bank groups suitable for use with the memory controller of FIG. 2 according to some implementations. For example, memory 300 is compatible with the JEDEC DDR5 standard, is organized into bank groups, and supports same bank refresh commands. Memory 300 includes generally a command interface 310, a command decoder 320, an input/output interface 330, a delay locked loop 340, a set of bank groups 350, and a data path 360.

Command interface 310 receives command and address signals and synchronizes them to input clock signals for use by memory 300. Command interface 310 has inputs for receiving signals including a differential clock signal pair labelled "Clk_tClk_c" including a true clock signal Clk_t and a complementary clock signal Clk_c, a chip select signal for a particular rank n labelled "CS_n", a set of command and address signals labelled "CA[13:0]", a command and address inversion control signal labelled "CAI", a mirrored signal to indicate whether the memory is being configured for mirrored mode or standard mode labelled "MIR", a connectivity test mode enable signal labelled "TEN", a command and address on-die termination signal labelled "CA_ODT", and an active-low reset signal labelled "RESET_n", and outputs for providing an internal clock signal labelled "CLK", a latched command, and an alert signal labelled "ALERT_n". The external signals are defined by the JEDEC DDR5 standard and most of them will not be discussed in detail, but FIG. 3 shows three signal groups of interest, namely CA[13:0], CS_n, and Clk_t/Clk_c. Command interface 310 receives one- or two-clock commands on the CA[13:0] signals synchronously with the differential clock signal when the CS_n signal is active, including a $REF_{sb}$ command, an all bank refresh command ($REF_{ab}$), and a per bank refresh command ($REF_{pb}$).

Command decoder 320 has inputs for receiving the latched command and the CLK signal, and outputs for providing various control signals to control the operation of memory 300. These control outputs include an output for controlling delay locked loop 340, an output for providing a latched address, and an output connected to input/output interface 330. Command decoder 320 includes a set of mode registers for storing various operating parameters according to the JEDEC DDR5 standard such as read and write latencies that determine when to output data in response to read and write commands, respectively.

Input/output interface 330 has an input connected to the output of command decoder 320, a second input for receiving a data timing signal labelled "LCLK", and bidirectional connections to data fabric 160 to conduct data signals labelled "DQ" and a differential data strobe signal formed by a true data strobe signal labelled "LDQS_t" and a complementary data strobe signal labelled "LDQS_c".

The input from command decoder 320 ensures that data is input or output, according to write and read commands respectively, at the cycles, and that read data is output edge aligned to the LCLK signal and that write data is captured on transitions of the LDQS_t/LDQS_c signals in which the memory controller is responsible for causing the data valid window to be center aligned with the LDQS_t/LDQS_c signals.

Delay locked loop 340 is a circuit that generates the LCLK signal to ensure the alignment of the data signals and the data strobe signals during write and read signals as noted above.

Bank groups 350 include a set of eight bank groups, in which each bank group has four banks, including a first representative bank group 351 and an eighth representative bank group 358. As can be envisioned from memory 300, a refresh group includes one corresponding bank from each bank group. For example, a first refresh group designated "RG0" can include the bottom left bank from each of the eight bank groups; a second refresh group designated "RG1" an include the top left bank from each of the eight bank groups; a third refresh group designated "RG3" an include the top right bank from each of the eight bank groups; and a fourth refresh group designated "RG4" an include the bottom left bank from each of the eight bank groups. Thus if bank group 351 includes banks labelled "0", "1", "2", and "3", the next bank group includes banks labelled "4", "5", "6", and "7", and so on until bank group 358 includes bank groups labelled "28", "29", "30", and "31". In this example, the first refresh group would include banks 0, 4, 8, 12, 16, 20, 24, and 28, the first refresh group would include banks 1, 5, 9, 13, 17, 21, 25, and 29, the third refresh group would include banks 2, 6, 10, 14, 18, 22, 26, and 30, and the fourth refresh group would include banks 3, 7, 11, 15, 19, 23, 27, and 31. However, other correspondence systems are possible.

Data path 360 includes one or more column address buffers, column selection circuitry, and the like for causing data to be written from input/output interface 330 to a selected memory bank of bank groups 350, or to be read from a selected memory bank of bank groups 350 to input/output interface 330.

Command decoder 320 supports a variety of commands defined by the JEDEC DDR5 standard, including an all-bank refresh command ($REF_{ab}$), a same bank refresh command ($REF_{sb}$) command in which a selected refresh group is refreshed while normal operations can continue in the other refresh groups, and a per bank refresh command ($REF_{pb}$) that ensures lower command latency while requiring higher refresh command overhead.

The JEDEC DDR5 standard requires that all banks of the memory must be refreshed, on average, within a refresh timing interval tREFI. If the REFsb command is used, then each refresh group must be refreshed, on average, within tREFI, although the order of refresh banks can vary. In particular, when issuing the REFsb command, the memory controller encodes the desired refresh group in the bank address (BA) signals of the CA[13:0] bus. In memory 300, there are four banks in each bank group, and the BA signals are 2-bit signals that select one of the four refresh groups, which are made up of four corresponding banks in each bank group. The inventor has leveraged this last property to intelligently schedule the order of same refresh commands to the bank groups during each tREFI period to improve memory bus efficiency and lower the average latency of memory accesses in the system.

Figure 4:
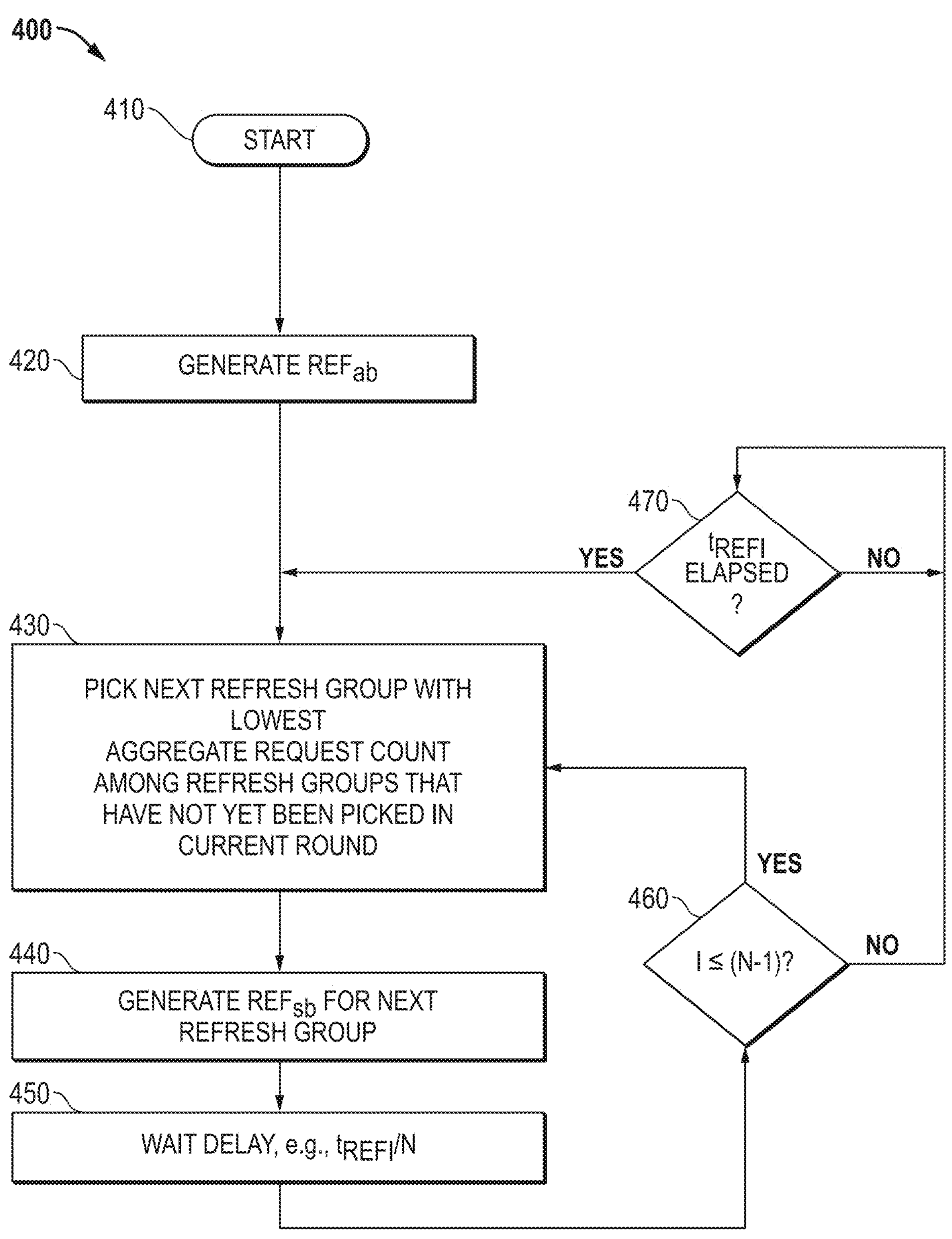
FIG. 4 illustrates a flow chart of a method for scheduling same bank refreshes by the refresh controller of FIG. 2 according to some implementations.

FIG. 4 illustrates a flow chart of a method 400 for scheduling same bank refreshes by refresh controller 232 of FIG. 2 according to some implementations. Method 400 starts in box 410. For example, box 410 could correspond to system startup or cold or warm boot.

In an action box 420, optimized refresh controller 232 generates an all-bank refresh command (REFab) at an action box 420. The REFab command ensures that the memory starts from a state in which all banks have been refreshed.

In an action box 430, refresh controller 232 picks a next refresh group with the lowest aggregate count of instructions in command queue 220 among refresh groups that have not yet been picked in the current round. Since every memory cell must be refreshed, on average, once every $t_{REFI}$, every refresh group will be picked once in a round that lasts about $t_{REFI}$.

In an action box 440, refresh controller 232 generates the REFsb commands for this next group, and sends it to arbiter 238 for insertion into the command stream with the bank address 0 (BA0) and bank address 1 (BA1) signals encoded in the CA[13:0] signals indicating the selected refresh group. For example, if both BA0=0 and BA1=0, then the refresh group would indicate that bank 0 in each bank group would be refreshed using the REFsb command. Arbiter 238 will send it to memory interface queue 214, which in turn sends it to the memory through the PHY.

In an action box 450, refresh controller 232 waits a delay before continuing. In a system with four refresh groups (n=4), this amount of time can be equal to tREFI/4 to evenly spread the refresh overhead over the $t_{REFI}$ period. In other implementations, the delay could be a lower amount.

In a decision box 460, refresh controller 232 evaluates whether not all refresh groups have been refreshed in the current round, i.e., whether an internal bank counter index I is less than or equal to (N−1), in which N is the number of refresh groups. If the condition $I \leq (N-1)$ is true, then flow returns to action box 430. If the condition $I \leq (N-1)$ is false, then flow continues to a decision box 470.

Decision box 470 determines whether the tREFI period has elapsed, i.e., whether the current round is over. If not, then flow returns to decision box 470. If so, then flow continues to action box 430, I is reset to 0, and a new round begins.

In the exemplary implementation, the steps of method 400 are implemented in hardware circuitry. This circuitry is not shown in detail, but the construction of the described functions in hardware circuitry would be readily apparent to those of ordinary skill in the art. For example, the circuitry could include timers, counters, state machines, registers, digital logic, and the like to implement method 400.

In a concrete example, assume command queue 220 has 64 entries, and the addressed memory has eight bank groups with four banks in each bank group. Each refresh group includes a corresponding bank in each of the eight bank groups. For the first refresh group selection in a given round, assume that the aggregate request count in command queue 220 of RG0 is 4, RG1 is 20, RG2 is 32, and RG4 is 8. Since RG0 has only 4 memory access requests in command queue 220, while RG1, RG2, and RG3 have 20, 32, and 8 memory access requests, respectively, RG0 has the lowest aggregate request count and has not yet been picked in this round. Therefore, optimized refresh controller 232 picks RG0 and generates a $REF_{sb}$ command for RG0 by encoding RG0 in the BG0 and BG1 signals within the REFsb command. In this way, while RG0 has few requests, RG1, RG2, and RG3 remain active to keep the memory bus better utilized while the $REF_{sb}$ command is in progress for all memory banks making up RG0. While RG0 is being refreshed, memory controller 200 issues commands for memory access requests to banks in RG1, RG2, and RG3 from command queue 220, and fills command queue 220 with new memory access requests for RG0-RG3. Refresh controller 232 determines the next selection by retrieving the request counts from command queue 220 at an appropriate time, such as when the next $REF_{sb}$ command becomes timing eligible.

For the second refresh group selection in the first round, assume that the aggregate request count in command queue 220, evaluated at the time of the selection, of RG0 is 20, RG1 is 16, RG2 is 10, and RG3 is 18. Since RG0 has already been picked in this round, refresh controller 232 selects the RG with the lowest aggregate request count among RR1, RG2, and RG3. In an example, the aggregate request count of RG0 is 20, RG1 is 16, RG2 is 10, and RG3 is 18. Thus, refresh controller 232 picks RG2 since it has the lowest aggregate request count and has not yet been picked in this round, and refresh controller 232 generates an $REF_{sb}$ command for RG2.

For the third refresh group selection in the first round, assume that the aggregate request count in command queue 220, evaluated at the time of the selection, of RG0 is 10, RG1 is 20, RG2 is 14, and RG3 is 22. Since RG0 and RG2 have already been picked in this round, refresh controller 232 selects the RG with the lowest aggregate request count among RG1 and RG3. In an example, the aggregate request count of RG1 is 20 and RG3 is 22. Thus, refresh controller 232 picks RG1 since it has the lowest aggregate request count and has not yet been picked in this round, and refresh controller 232 generates an $REF_{sb}$ command for RG3.

For the fourth refresh group selection in the first round, assume that the aggregate request count in command queue 220, evaluated at the time of the selection, of RG0 is 4, RG1 is 20, RG2 is 32, and RG3 is 8. Since RG0, RG1, and RG2 have already been picked in this round, refresh controller 232 selects the only remaining RG, RG3, since it also has the lowest aggregate request count among the refresh groups that have not yet been picked in this round, and refresh controller 232 generates an $REF_{sb}$ command for RG3.

This process is repeated in each succeeding round in this fashion continuously while the system is powered up and active.

If there is more than one rank in the system, the process shown in FIG. 4 is modified such that at action boxes 430 and 440, refresh controller 232 picks the next refresh group according to this technique for each rank. Alternatively, in a system with two ranks, the flow shown in boxes 430-470 could be carried out for one rank in tREFI/2 with a delay equal to tREFI/2N between refresh group selection and REFsb commands. However, such a system could cause higher average latency when the workload is high across multiple bank groups in the rank than for the systems in which the ranks are alternated.

Thus, a data processor, data processing system, and method have been described that can be used to improve performance thereof when using the same bank refresh command. A memory controller schedules same bank refresh commands to refresh groups in an order that achieves better efficiency given the current workload of the memory controller. The memory controller counts the number of memory access requests to refresh groups in the command queue, and schedules same bank refresh commands in an order that avoids more-active refresh groups while picking less-active refresh groups to send same bank refresh commands to. In particular, it examines the commands present in a command queue of the memory controller, and determines an aggregate request count as the sum of all the commands for all the banks in a particular refresh group. It schedules same bank refresh commands in an order within a refresh round to achieve better bus utilization, leveraging the property that same bank refreshes can be scheduled in any order within a round corresponding to tREFI.

While particular implementations have been described, various modifications of these implementations will be apparent to those skilled in the art. For example, while various examples were described above for DDR5 DRAMs, they are applicable to other volatile memories having bank groups that support same bank refresh commands. The exemplary implementations used memory organized into eight bank groups with four banks each, but in other embodiments, the number of bank groups and the number of banks per bank group may vary. Also, a memory controller may observe other timing constraints besides the tREFI interval described above, and work with other mechanisms such as row-hammer mitigation mechanisms. The memory controller may simultaneously support other refresh commands, including all bank refresh and per bank refresh.

Accordingly, it is intended by the appended claims to cover all modifications of the disclosed implementations that fall within the scope of the disclosed implementations.

What is claimed is:

1. A data processor comprising:

a memory accessing agent for generating memory access requests for a memory; and a memory controller comprising:

a command queue for storing the memory access requests; and a refresh controller coupled to the command queue and operable to select an order of providing same bank refresh commands to a plurality of refresh groups of corresponding banks in the memory based on an aggregate request count of the memory access requests in the command queue, the order based on updated aggregate request counts of remaining refresh groups that have not yet been picked during a refresh interval.

2. The data processor of claim 1, wherein the refresh controller is operable to pick a next refresh group with a lowest aggregate request count of the memory access requests in the command queue among one or more refresh groups that have not yet been picked in the refresh interval, and to generate a corresponding same bank refresh command for the next refresh group.

3. The data processor of claim 1, wherein the memory controller further comprises:

an arbiter coupled to the command queue and to the refresh controller for selecting memory commands from among the memory access requests stored in the command queue and refresh requests from the refresh controller.

4. The data processor of claim 1, wherein:

the refresh controller is operable to select the order of providing the same bank refresh commands for each of a plurality of refresh intervals.

5. The data processor of claim 4, wherein:

the refresh controller provides the same bank refresh commands for all of the plurality of refresh groups for each of a plurality of ranks of memory.

6. A data processing system comprising:

a data processor; and a memory coupled to the data processor and operable to execute a same bank refresh command by refreshing a group of corresponding banks in response to the same bank refresh command, wherein the data processor comprises a memory controller having a command queue for storing memory access requests, wherein the memory controller is operable select an order of providing same bank refresh commands to a plurality of refresh groups of the corresponding banks in the memory based on an aggregate request count of the memory access requests in the command queue, the order based on updated aggregate request counts of remaining refresh groups that have not yet been picked during a refresh interval.

7. The data processing system of claim 6, wherein:

the memory controller is operable to generate a corresponding same bank refresh command for a next refresh group.

8. The data processing system of claim 6, wherein:

the memory controller is further operable to select the order of providing the same bank refresh command for each of a plurality of refresh intervals.

9. The data processing system of claim 8, wherein:

the memory controller provides the same bank refresh commands for the plurality of refresh groups in each of the plurality of refresh intervals for each of a plurality of ranks of the memory.

10. The data processing system of claim 8, wherein the memory controller comprises:

a refresh controller coupled to the command queue for selecting the same bank refresh commands; and an arbiter coupled to the command queue and to the refresh controller for selecting memory commands from among the memory access requests stored in the command queue and refresh requests from the refresh controller.

11. The data processing system of claim 10, wherein:

the refresh controller is further operable to select the order by repetitively selecting a next refresh group among the plurality of refresh groups that has a lowest aggregate request count and has not yet been picked in a particular refresh interval until all of the plurality of refresh groups have been picked.

12. The data processing system of claim 11, wherein:

the refresh controller provides the same bank refresh commands for all of the plurality of refresh groups for each of a plurality of ranks of the memory.

13. The data processing system of claim 6, wherein:

the memory comprises a dynamic random access memory.

14. A method for refreshing a memory having a plurality of bank groups by a memory controller having a command queue for storing memory access requests, comprising:

during a predetermined time interval:

picking a next refresh group with a lowest aggregate request count of the memory access requests in the command queue among one or more refresh groups that have not yet been picked in a current round, wherein each refresh group defines a corresponding bank in each of the plurality of bank groups; and generating a same bank refresh command for the next refresh group, wherein the picking comprises picking in an order based on updated aggregate request counts of remaining refresh groups that have not yet been picked during a refresh interval.

15. The method of claim 14, wherein:

the predetermined time interval of time comprises a maximum refresh time internal (tREFI).

16. The method of claim 14, further comprising:

providing the same bank refresh command to the memory using a physical interface circuit connected to the memory controller.

* * * * *